United States Patent [19]

Rodriguez-Cavazos

[11] Patent Number: 5,010,281
[45] Date of Patent: Apr. 23, 1991

[54] HIGH VOLTAGE STABILIZATION CIRCUIT FOR VIDEO DISPLAY APPARATUS

[75] Inventor: Enrique Rodriguez-Cavazos, Indianapolis, Ind.

[73] Assignee: RCA Licensing Corporation, Princeton, N.J.

[21] Appl. No.: 516,487

[22] Filed: Apr. 30, 1990

[51] Int. Cl.[5] .................. H01J 29/70; H04N 5/63
[52] U.S. Cl. ................................ 315/411; 358/190
[58] Field of Search ...................... 315/411; 358/190

[56] References Cited

U.S. PATENT DOCUMENTS 4,728,868  3/1988  Ishikawa et al. ............ 315/411
4,812,720  3/1989  Haferl .......................... 315/411

OTHER PUBLICATIONS

U.S. patent application No. 398,515, in the names of Rodriguez-Cavazos et al., entitled High Voltage Regulator Circuit for Picture Tubes.

Primary Examiner—Gregory C. Issing
Attorney, Agent, or Firm—Joseph S. Tripoli; Joseph J. Laks; Sammy S. Henig

[57] ABSTRACT

A horizontal deflection circuit output stage generates a retrace pulse in a tertiary winding of a flyback transformer. A flyback pulse that is substantially wider than the retrace pulse is produced in a winding of a second transformer that is coupled in series with the tertiary winding such that the retrace pulse occurs when a peak portion of the flyback pulse is already relatively "flat". The amplitude of the flyback pulse is controlled in a negative feedback loop for stabilizing an ultor voltage.

13 Claims, 1 Drawing Sheet

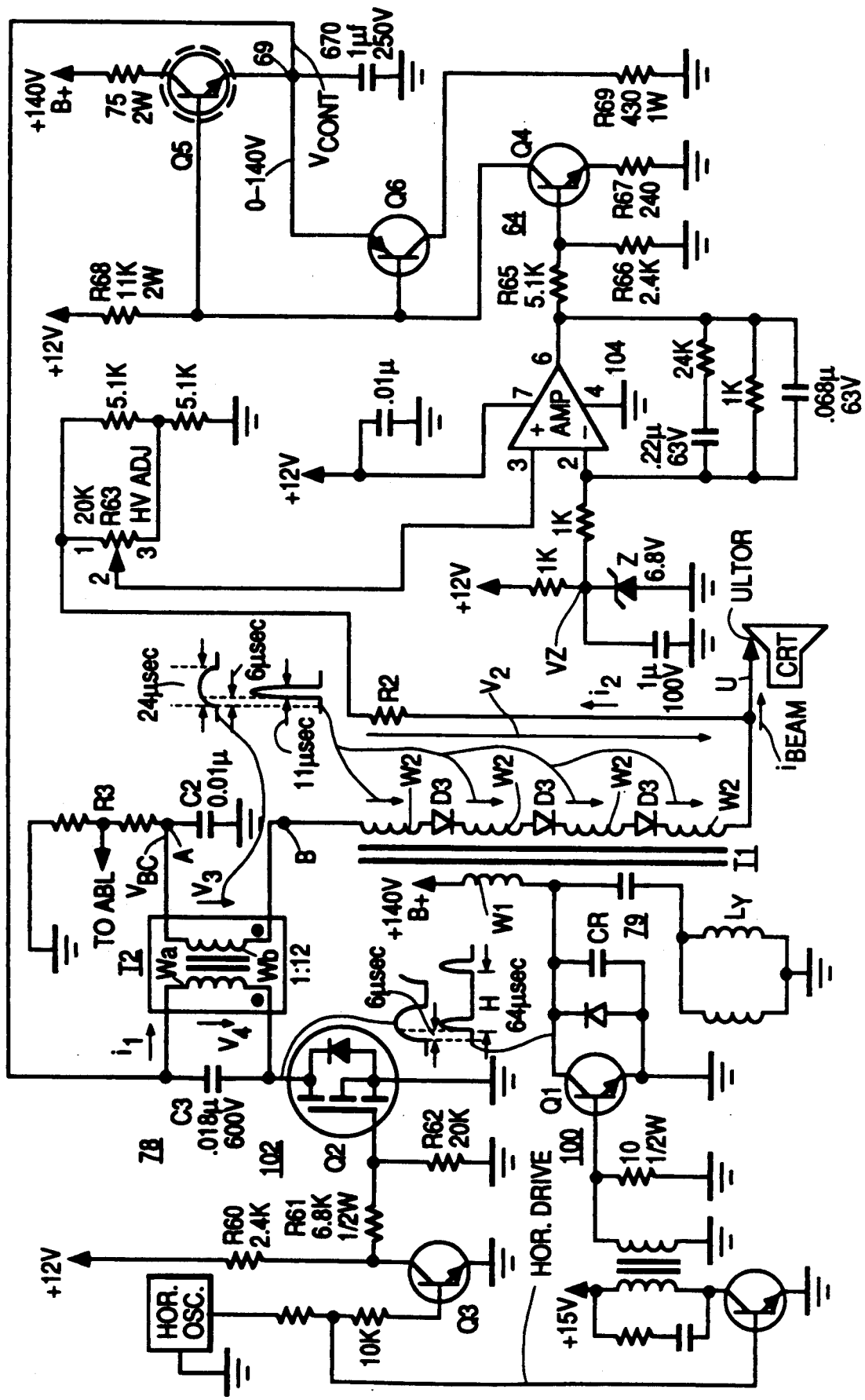

HIGH VOLTAGE STABILIZATION CIRCUIT FOR VIDEO DISPLAY APPARATUS

This invention relates to a power supply for a television apparatus with high voltage stabilization.

In television receiver or monitor circuits, the ultor accelerating potential or high voltage for a picture tube is, typically, derived by recifying a retrace pulse voltage developed in a high voltage winding horizontal output of a flyback transformer. The retrace pulse voltage is developed by a horizontal deflection circuit output stage that is coupled to the high voltage winding via the primary winding of the flyback transformer. The horizontal deflection circuit output stage comprises a horizontal deflection winding, a retrace capacitor and a trace switch, comprising a damper diode and a horizontal output transistor.

In typical television receive circuits, raster size is inversely proportional to the square root of the ultor accelerating potential. Because the high voltage circuit exhibits a certain amount of source impedance, increasing the load current drawn from the ultor terminel will result in a decreased ultor accelerating potential. Ultor voltage variations resulting from variation of beam current occur mainly due to a leakage inductance between the high voltage and the primary winding of the flyback transformer. Ultor voltage variations lead to reduced performance. The reduced performance is manifested by undersirable raster size variations, reduced peak brightness and poor focus at high beam currents.

Because of the advent of, for example, very large picture tubes having increased resolution capability and the advent of high defining television, it may be desirable to have a better stabilized or regulated ultor voltage so as to obtain better display performance over the entire beam current or brightness range. It may be further desirable to have the ultor voltage adjustable to the maximum permissible value, taking into account the X-radiation limit, to obtain high brightness at low beam current and, therefore, a better spot size.

U.S. Pat. No. 4,738,868 in the names of Ishikawa et al., entitled "A High Voltage Generating Circuit" (the Ishikawa et al., patent) shows a high voltage stabilization circuit. There, a horizontal deflection circuit applies a first flyback pulse across a primary coil of a flyback transformer, while a second flyback resonance circuit supplies a second flyback pulse to a lower voltage side of a tertiary winding of the flyback transformer. A DC voltage supplied to the second flyback resonance circuit is controlled in response to an ultor voltage produced from the tertiary winding of the flyback transformer. The ultor voltage level is determined in accordance with a sum of the first and second flyback pulses. In the Ishikawa et al. patent, the second flyback pulse is narrower relative to the first flyback pulse. Therefore, any phase perturbation between the first and second flyback pulses that may occur, for example, due to beam current variation may tend to produce an undesirable transient change in the ultor voltage.

A high voltage power supply of a video apparatus, embodying an aspect of the invention, includes a source of an input signal at a frequency that is related to a deflection frequency and a first flyback resonant circuit. A first switching arrangement responsive to the input signal and coupled to the first flyback resonant circuit generates a periodic, resonant first flyback pulse voltage that is developed across a high voltage winding of a flyback transformer. A second switching arrangement responsive to a control signal and coupled to a second flyback resonant circuit generates at a first terminal of the high voltage winding a periodic, resonant second flyback pulse voltage at a controllable amplitude that is applied in series with the first flyback pulse voltage. The start of the second flyback pulse voltage leads that of the first flyback pulse voltage. A high voltage pulse, developed from a voltage at a second terminal of the high voltage winding, has an amplitude that varies in accordance with the amplitude of the second flyback voltage. A control circuit generates the control signal to vary the amplitude of the second flyback voltage and, thereby, to vary the amplitude of the high voltage pulse.

In an embodiment of the invention, the second flyback pulse voltage has a pulse-width that is larger than that of the first flyback pulse voltage. The first flyback pulse voltage occurs when the wider, second flyback pulse is at its "flat" peak portion. Therefore, a sudden phase perturbation between the two flyback pulse voltages that occurs as a result of, for example, a sudden significant beam current change will, advantageously, produce a smaller change in the ultor voltage than if the width of the second flyback pulse voltage were narrower than that of the first flyback pulse voltage.

The sole FIGURE illustrates a horizontal deflection circuit with ultor voltage stabilization, embodying an aspect of the invention.

The sole FIGURE illustrates a horizontal deflection circuit 100 and a high voltage stabilization circuit 102, embodying an aspect of the invention, that generates a stabilized ultor voltage U. For simplicity, east-west raster correction, horizontal linearity correction and component values, which are not relevant for explaining the invention, are omitted from the FIGURE.

High voltage stabilization circuit 102 includes a switching transistor Q2, responsive to a horizontal rate drive signal HORDRIVE, a retrace capacitor C3 and a primary winding Wa of a transformer T2. Transformer T2 has a secondary winding Wb for developing a flyback voltage V3 between terminals A and B. Winding Wb is coupled at terminal B in series with a tertiary, high voltage winding W2 of a flyback transformer T1. Winding W2 is formed by, for example, four winding segments that are coupled in series via diodes D3 that form a split diode arrangement, in a well known manner.

A switching transistor Q1 of deflection circuit 100, also responsive to horizontal rate drive signal HORDRIVE, generates a horizontal rate flyback or retrace voltage V1 in a deflection retrace of flyback resonant circuit 79 that is coupled via a primary winding W1 of transformer T1 to winding W2 to form a horizontal rate retrace or flyback high voltage V2 in winding W2. High voltage V2 is equal to the sum of the retrace pulse voltages in each of the four winding segments of winding W2. The waveform of voltage V2 that is shown in the FIGURE would have been obtained across winding W2 had a diode split arrangement were not utilized but, instead, a rectifying diode had been coupled between an end terminal C of such winding W2 and an ultor electrode ULTOR of the picture tube. Such waveform of voltage V2 is equivalent to a sum of the voltage in the winding segments of winding W2. An ultor voltage U is generated in accordance with a sum of retrace voltage V2 and and flyback voltage V3. For example, the peak amplitude of voltage V2 is 27 KV and that of voltage V3 is 4 KV.

A beam current sampling resistor R3 and a capacitor C2 that are coupled in parallel are compled between terminal A of winding Wb and ground. Consequently, a beam current dependent negative voltage $V_{BC}$ is developed across resistor R3 at terminal A which serves to lower the settings of brightness or contrast or both at excessive average beam currents. Voltage $V_{BC}$ at terminal A has no appreciable influence on stabilization circuit 102 and, therefore, is not referred to in the description that follows.

Stabilization circuit 102 operates as an energy flywheel. When transistor Q2 is conductive, an increasing ramp current $i_1$ flows through winding Wa and stores energy in winding Wa. When transistor Q2 is switching off, the stored energy is transferred into retrace capacitor C3 and develops a retrace voltage V4 across capacitor C3 and across winding Wa that forms with capacitor C3 a flyback resonant circuit 78. Voltage V4 is transformer coupled to winding Wb and appears as flyback voltage V3 across winding Wb that is in series with retrace voltage V2.

In accordance with an inventive feature, a flyback interval $t_a$ of voltage V3 is substantially longer than a deflection retrace interval $t_r$ of voltage V2. For exmple, the deflection retrace time $t_r$ may be 11.6 microseconds, corresponding to retrace resonance frequency of 44 KHZ. In contrast, the flyback interval $t_a$ of voltage V3 may be 24 microseconds, corresponding to flyback resonance frequency of 20.8 KHZ.

Signal HORDRIVE is coupled to a gate electrode of transistor Q2 via an inverter stage that includes a transistor Q3 and resistor R60, R61 and R62. The storage time in transistor Q1 is, for example, 6 microseconds; whereas, the storage time of the combination of transistor Q3 is substantially smaller because of a smaller peak collector current in transistor Q3. Therefore, the leading edge of the flyback pulse of voltage V3 will occur substantially earlier than that of voltage V2. Therefore, the entire pulse of voltage V2 will occur during the peak, flat portion of the wide pulse of voltage V3. The peak portion of the pulse of pulse voltage V3 is relatively "flat" when the peak of the pulse of voltage V2 occurs, because each pulse of voltage V3 overlaps the corresponding pulse of pulse voltage V2. Therefore, in accordance with an inventive feature, phase perturbations between the pulse of pulse voltages V2 and V3 that occur due to, for example, sudden beam current variations will not cause a significant change in ultor voltage U.

A control circuit 103 of circuit 102 provides an energizing CD voltage $V_{CONT}$ that controls the amplitude of pulse voltage V4 and V3. The level of voltage $V_{CONT}$ varies in accordance with a current $i_2$ that flows in a bleeder resistor R2 that is indicative of the level of ultor voltage U. Bleeder resistor R2 provides a focus voltage and a Grid 2 voltage, not shown, to the picture tube. Ultor voltage U is proportional to the peak value of the sum of retrace voltage V2 and V3. That peak voltage is controlled by control circuit 103. Ultor voltage U is held constant by a negative feedback loop of control circuit 103.

Control circuit 103, embodying another aspect of the invention, includes a differential amplifier 104 having an inverting terminal that is coupled to a reference voltage VZ developed in a zener diode Z. A noninverting input terminal of amplifier 104 is coupled to a low end of bleeder resistor R2 via an adjustable resistor R63 that is used for adjusting ultor voltage U. An output terminal of amplifier 104 is coupled via a signal inverting stage 64 that includes a transistor Q4 and resistors R65, R66, R67 and R68. The collector of transistor Q4 is coupled to the base electrodes of transistor Q5 and Q6 operating in a push-pull manner as emitter followers. Voltages $V_{CONT}$ is developed at a junction terminal 69 between the emitters of transistors Q5 and Q6. A filter capacitor C70 is coupled between terminal 69 and ground. A change in ultor voltage U will produce a corresponding change in voltage $V_{CONT}$ in a negative feedback manner to vary the peak amplitude of voltage V3 that stabilizes ultor voltage U.

Because winding Wb of transformer T2 is coupled in a current path of a beam current $i_{BEAM}$ that flows in ultor terminal ULTOR of the picture tube, current $i_{BEAM}$ is transformer-coupled back to winding Wa to flow in an opposite direction to the arrow associated with current $i_1$. Transformer-coupled current $i_{BEAM}$ tends to charge capacitor C70 and to make voltage $V_{CONT}$ at terminal 69 more positive. It may be desirable to enable voltage $V_{CONT}$ to become as low as zero volts at the high beam current, so as to maintain a large regulation range.

In accordance with further aspect of the invention, transistor Q6 is capable of current sinking transformer-coupled current $i_{BEAM}$. Therefore, the voltage range of voltage $V_{CONT}$ can be as low as zero volts at the high beam current. Had transistor Q6 been eliminated, the transformer-coupled beam current would have caused voltage $V_{CONT}$ to be positive at such high beam current. By enabling voltage $V_{CONT}$ to become as low as zero volts the regulation range is, advantageously, increased.

What is claimed is:

1. A high voltage power supply of a video apparatus, comprising:

a source of an input signal at a frequency that is related to a deflection frequency;

a first flyback resonant circuit that includes a deflection winding;

first switching means responsive to said input signal and coupled to said first flyback resonant circuit for generating a resonant first flyback pulse voltage at a frequency that is related to a deflection frequency that is developed across a high voltage winding of a flyback transformer;

a second flyback resonant circuit;

second switching means responsive to said input signal and coupled to said second flyback resonant circuit for generating a resonant second flyback pulse voltage at a frequency that is related to said deflection frequency having a controllable amplitude, said second flyback pulse voltage being applied in series with said first flyback voltage to produce a high voltage pulse that is coupled to an electrode of a cathode ray tube having an amplitude that is in accordance with a sum of said first and second flyback pulse voltages, such that a leading edge of a given pulse of said second flyback voltage occurs prior to a leading edge of said first flyback pulse voltage; and a control circuit for varying said amplitude of said second flyback pulse voltage in a manner that varies said amplitude of said high voltage pulse.

2. A high voltage power supply according to claim 1 further comprising, rectifer means coupled to said high voltage winding for generating a rectified high voltage that is coupled to an ultor electrode of said cathode ray tube wherein said control circuit is responsive to said rectified high voltage for varying said amplitude of said second flyback voltage pulse in a negative feedback manner when said ultor voltage varies to stabilize said rectified high voltage.

3. A high voltage power supply according to claim 1 wherein said deflection winding comprises a horizontal deflection winding.

4. A high voltage power supply according to claim 1 wherein said flyback transformer comprises a primary winding that is coupled to said first flyback resonant circuit and wherein said high voltage winding comprises a tertiary winding of said flyback transformer.

5. A power supply according to claim 1 wherein said flyback resonance frequency of said second flyback resonant circuit is substantially lower than that of said first flyback resonant circuit.

6. A power supply according to claim 1 wherein said first and second flyback pulse voltages are produced in windings that are magnetically separated and wherein said amplitude of high voltage pulse is equal to said sum of said first and second flyback pulse voltage.

7. A power supply according to claim 1, wherein said high voltage winding of said first flyback transformer is magnetically coupled to said first flyback resonant circuit, wherein a winding of a second flyback transformer is magnetically coupled to said second flyback resonant circuit and wherein said winding of said first and second flyback transformers are coupled in series to produce at a terminal of one of said windings said high voltage pulse that is coupled to an input terminal of a high voltage rectifier for generating a recified high voltage at an output terminal of said recifier.

8. A power supply according to claim 1 wherein said second flyback pulse voltage has a pluse width that is larger than that of said first flyback pulse voltage.

9. A power supply according to claim 8 wherein a peak of said first flyback pulse voltage occurs after a rate of change of said second flyback pulse voltage has become smaller to prevent a phase perturbation between said first and second pulse voltage from affecting said ultor voltage.

10. A high voltge power supply of a video apparatus, comprising:
a source of an input signal at a frequency that is related to a deflection frequency;
a retrace resonant circuit that includes a deflection winding;
first switching means responsive to said input signal and coupled to said retrace resonant circuit for generating a periodic, resonant retrace pulse voltage that is developed across a high voltage winding of a flyback transformer;
a flyback resonant circuit;
second switching means responsive to said input signal and coupled to said flyback resonant circuit for generating a periodic, resonant flyback pulse voltage at a controllable amplitude that is applied in series with said retrace pulse voltage to produce a high voltage pulse that is coupled to an electrode of a cathode ray tube having an amplitude that varies in accordance with a sum of said retrace and flyback pulse voltages, a given pulse of said retrace pulse voltage occurring after a rate of change in a corresponding pulse of said flyback pulse voltage has become smaller to prevent phase perturbation in said retrace pulse voltage from affecting a peak amplitude of said high voltage pulse; and
a control circuit for generating a control signal that is coupled to said second flyback pulse voltage in a manner that varies said amplitude of said high voltage pulse.

11. A high voltage power supply of a video apparatus, comprising:
a source of an input signal at a frequency that is related to a deflection frequency;
a first flyback resonant circuit;
a first flyback transformer;
first switching means responsive to said input signal and coupled to said first flyback resonant circuit for generating a periodic, resonant first flyback pulse voltage that is developed across a high voltage winding of said flyback transformer;
a second flyback transformer;
second switching means responsive to said input signal and coupled to a first terminal of a first winding of said second flyback transformer for generating a periodic, resonant second flyback pulse voltage at a controllable amplitude at a second winding of said second flyback transformer, said second winding of said second flyback transformer being coupled in series with said high voltage winding to produce across said series coupled winding a high voltage pulse that is coupled to an ultor electrode of a cathode ray tube having an amplitude that varies in accordance with said controllable amplitude of said second flyback voltage pulse, said high voltage pulse producing a beam current in sid ultor electrode that is transformer-coupled via said second winding of said second flyback transformer back to said first winding of said second flyback transformer; and
means coupled to a second terminal of said first winding of said second flyback transformer for generating at said second terminal a control voltage at a controllable magnitude to control said amplitude of said second flyback pulse voltage, said control voltage generating means forming a low impedance at said second terminal with respect to said transformer-coupled beam current to prevent said transformer-coupled beam current from reducing a voltage range that said control voltage can assume.

12. A power supply according to claim 11 wherein said control voltage generating means comprises a pair of transistors coupled in a push pull manner to said second terminal of said first winding of said second flyback transformer.

13. A high voltage power supply of a video apparatus, comprising:
a source of an input signal at a first frequency;
a first flyback resonant circuit;
first switching means responsive to said input signal and coupled to said first flyback resonant circuit for generating a resonant first flyback pulse voltage at a frequency that is related to said first frequency that is developed across a high voltage winding of a flyback transformer;
a second flyback resonant circuit;
second switching means responsive to said input signal and coupled to said second flyback resonant circuit for generating a resonant second flyback pulse voltage at a frequency that is related to said first frequency having a controllable amplitude, said second flyback pulse voltage being applied in series with said first flyback pulse voltage to produce a high voltage pulse that is coupled to an electrode of a cathode ray tube having an amplitude that is in accordance with a sum of said first and second flyback pulse voltages, such that a leading edge of a given pulse of said second flyback pulse voltage occurs prior to a leading edge of said first flyback pulse voltage; and p1 a control circuit for varying said amplitude of said second flyback pulse voltage in a manner that varies said amplitude of said high voltage pulse.

* * * * *